97437
*J. G. Perry.*  *Hay Tedder.*
PATENTED NOV 30 1869
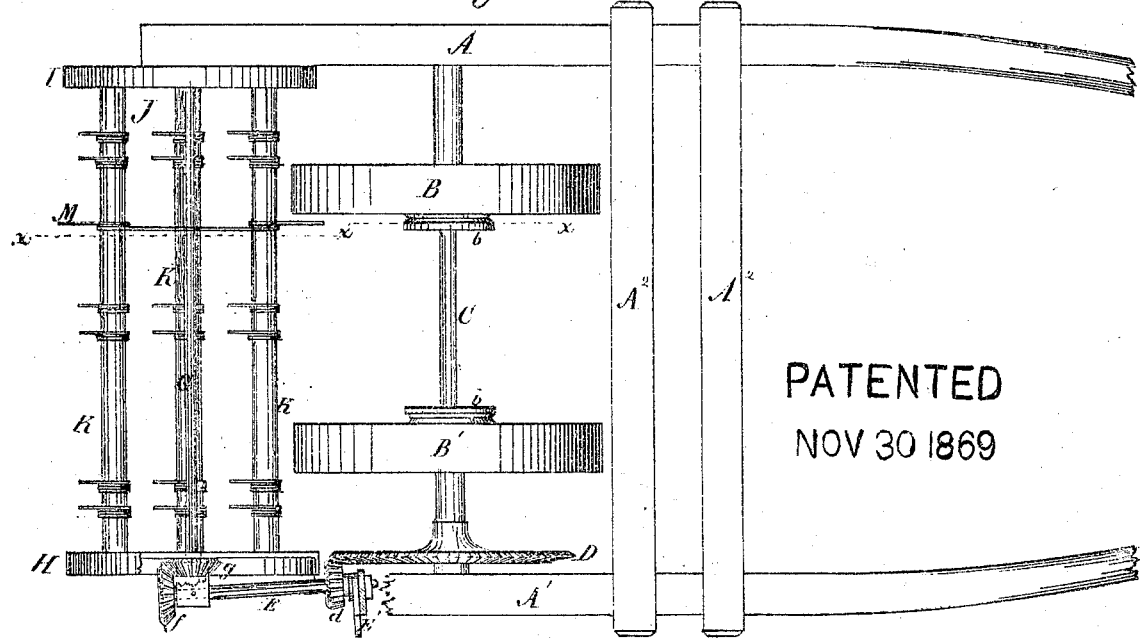
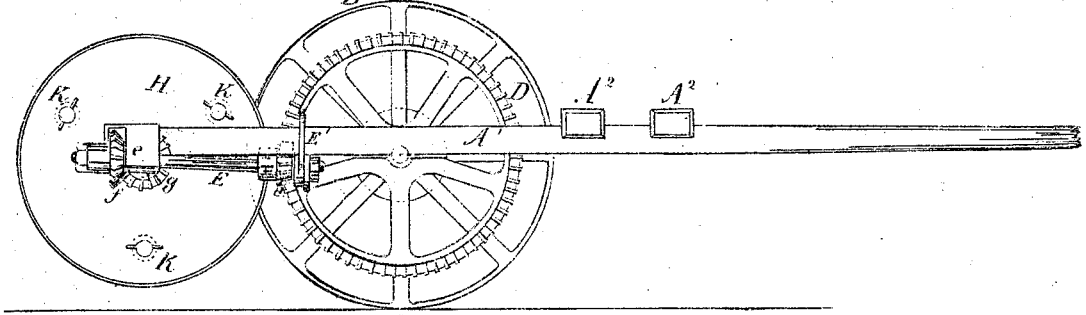
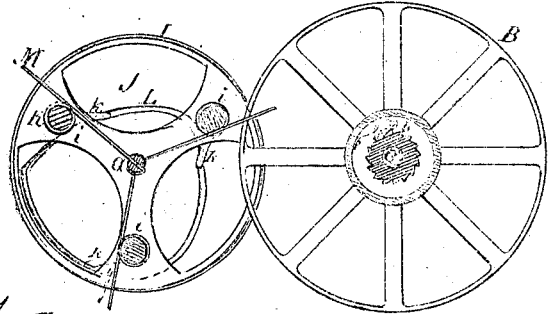
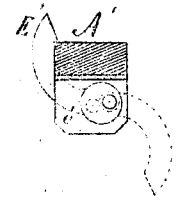

United States Patent Office.

JOHN G. PERRY, OF KINGSTON, RHODE ISLAND.

Letters Patent No. 97,437, dated November 30, 1869.

IMPROVED HAY-TEDDER.

The Schedule referred to in these Letters Patent and making part of the same.

*To all whom it may concern:*

Be it known that I, JOHN G. PERRY, of Kingston, in the county of Washington, and State of Rhode Island, have invented certain new and useful Improvements in Hay-Tedders, of which the following is a full, clear, and exact description, reference being had to the accompanying drawings, which make part of this specification, and in which—

Figure 1 is a plan or top view of a machine embracing my improvements.

Figure 2, a view, in elevation, of one side of the same.

Figure 3, a vertical longitudinal section through the same, at the line $x\,x$ of fig. 1.

Figure 4, an end view of the countershaft and its shifting-lever.

The objects of my invention are to secure a compact arrangement of the mechanism, and to move the teeth properly to seize and stir the grass without throwing it forward over the reel; and the mechanism hereinafter described embodies the improvements I have devised for attaining these results.

In the accompanying drawings, the frame of the mechanism is shown as consisting of two thills, A A¹, connected by cross-bars A².

Two driving-wheels, B B', are mounted loosely on an axle, C, with which they are locked, when the machine is advancing, by backing-ratchets $b$, of well-known construction, which arrangement permits the machine to be backed without working the reel.

The axle C also revolves in proper bearings in the frame-work.

A bevel-wheel, D, fast on the axle, drives a corresponding pinion, $d$, on a countershaft, E, which carries on its rear end a bevel-gear, $f$, meshing into a corresponding pinion, $g$, on a shaft, G, mounted, in proper bearings, on the rear ends of the thills A A¹.

The driving-wheels, and the main bevel-wheels, it will be observed, are arranged between the thills.

The countershaft E is arranged longitudinally beneath the thill A¹, and has a slight play in its rear bearing $e$, while its front end is mounted eccentrically in a block, $e'$, turning in a bearing, and controlled by a shipping-lever, E'. By this means, when the shipping-lever E' is in the position shown in dotted lines in fig. 4, the gears D $d$ are disconnected, and when the lever is raised, as in figs. 1, 2, and 4, the mechanism is in gear.

A disk, H, is fixed on one end of the reel-shaft G, inside the thills, and a ring, I, connected with the reel-shaft by arms $i$, is fixed on the outer end of said shaft.

The ring I revolves around a disk, J, fixed on the inner side of the thill A.

Rock-shafts K turn loosely in bearings in the rotating disk H, and the arms of the ring I.

These shafts project through the arms of the ring I, and their projecting ends are provided with cranks $k$, which enter a cam-groove, L, in the fixed disk J.

The rock-shafts K carry spring-teeth M, and the groove L is so shaped that the teeth are caused to project beyond the periphery of the disk H, when moving backward, as on the lower half of their circuit, so as to stir and spread the hay, but are turned inward and backward when moving forward on the upper portion of their circuit, and the rock-shafts can thus be arranged close to the driving-wheels, without the teeth coming in contact with them.

In operation, as the machine advances over the field, the driving-wheels revolve and communicate motion to the shaft G, through the gearing, and the rock-shafts K revolve with this shaft, during which movement they are also rocked in their bearings by means of the cranks $k$, which traverse the cam-groove L, as before described, so that as each bar descends toward the grass, its teeth will project downward to turn up the grass, but will be retracted as the teeth rise, and turned back so as not to throw the grass over to the front.

I am aware that reels, wider than the distance between the driving-wheels, have heretofore been invented, and do not claim such arrangement.

What I claim as my invention, and desire to secure by Letters Patent, is—

1. The combination of the thills, the loose driving-wheels, the revolving main shaft, its bevel-wheel, the revolving disk, the revolving ring, the cranked rock-shafts carrying the teeth and the cam-groove, all constructed and operating substantially as set forth.

2. The combination of the revolving disk, the revolving ring, the cranked rock-shaft carrying the teeth, the fixed disk, and the cam-groove, all constructed and operating as set forth.

3. In a hay-tedder, the cam-groove L, in combination with the cranked rock-shafts K, these parts being constructed to operate as and for the purposes specified.

JOHN G. PERRY.

Witnesses:
ELISHA O. CLARKE,
HENRY T. BRAMAN.